United States Patent
Jiang et al.

(10) Patent No.: US 10,322,510 B2
(45) Date of Patent: Jun. 18, 2019

(54) FINE-GRAINED OBJECT RECOGNITION IN ROBOTIC SYSTEMS

(71) Applicant: Futurewei Technologies, Inc., Plano, TX (US)

(72) Inventors: Wei Jiang, Santa Clara, CA (US); Wei Wang, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 130 days.

(21) Appl. No.: 15/449,541

(22) Filed: Mar. 3, 2017

(65) Prior Publication Data

US 2018/0250826 A1 Sep. 6, 2018

(51) Int. Cl.

| | |
|---|---|
| *G06K 9/62* | (2006.01) |
| *G06K 9/00* | (2006.01) |
| *B25J 9/16* | (2006.01) |
| *G06K 9/32* | (2006.01) |
| *H04N 7/18* | (2006.01) |
| *G06K 9/20* | (2006.01) |

(52) U.S. Cl.
CPC ........ *B25J 9/1697* (2013.01); *G06K 9/00664* (2013.01); *G06K 9/3233* (2013.01); *G06K 9/627* (2013.01); *G06K 9/6248* (2013.01); *G06K 9/6255* (2013.01); *G06K 9/6256* (2013.01); *G06K 9/2027* (2013.01); *G06K 9/6269* (2013.01); *H04N 7/185* (2013.01)

(58) Field of Classification Search
None
See application file for complete search history.

(56) References Cited

U.S. PATENT DOCUMENTS

| | | | |
|---|---|---|---|
| 5,608,819 A | 3/1997 | Ikeuchi | |
| 9,928,448 B1 * | 3/2018 | Merler | G06K 9/66 |
| 2014/0086497 A1 * | 3/2014 | Fei-Fei | G06K 9/00369 |
| | | | 382/224 |

(Continued)

FOREIGN PATENT DOCUMENTS

| | | |
|---|---|---|
| CN | 103955702 A | 7/2014 |
| CN | 106028134 A | 10/2016 |

OTHER PUBLICATIONS

"International Application Serial No. PCT/CN2018/078019, International Search Report dated Jun. 1, 2018", 4 pgs.

(Continued)

*Primary Examiner* — Randolph I Chu (74) *Attorney, Agent, or Firm* — Schwegman Lundberg & Woessner, P.A.

(57) ABSTRACT

A method for fine-grained object recognition in a robotic system is disclosed that includes obtaining an image of an object from an imaging device. Based on the image, a deep category-level detection neural network is used to detect pre-defined categories of objects. A feature map is generated for each pre-defined category of object detected by the deep category-level detection neural network. Embedded features are generated, based on the feature map, using a deep instance-level detection neural network corresponding to the pre-defined category of the object, wherein each pre-defined category of an object comprises a corresponding different instance-level detection neural network. An instance-level of the object is determined based on classification of the embedded features.

20 Claims, 3 Drawing Sheets

(56) References Cited

U.S. PATENT DOCUMENTS

2016/0292510 A1   10/2016  Han et al.
2018/0165551 A1*  6/2018  Roh ..................... G06K 9/6267

OTHER PUBLICATIONS

"International Application Serial No. PCT/CN2018/078019, Written Opinion dated Jun. 1, 2018", 5 pgs.

"Research Mobile Robots—Pioneer P3-DX", [online]. [retrieved on May 17, 2016]. Retrieved from the Internet: <https://web.archive.org/web/20160517155734/http://www.mobilerobots.com/researchrobots/pioneerp3dx.aspx>, (2016), 3 pgs.

Branson, Steve, et al., "Improved Bird Species Recognition Using Pose Normalized Deep Convolutional Nets", British Machine Vision Conference, (2014), 1-14.

Dai, Jifeng, et al., "R-FCN: Object Detection via Region-based Fully Convolutional Networks", 30th Conference on Neural Information Processing Systems (NIPS 2016), Barcelona, Spain, (2016), 1-9.

Gavves, E., et al., "Fine-Grained Categorization by Alignments", 2013 IEEE International Conference on Computer Vision, (2013), 1713-1720.

Girshick, Ross, et al., "Fast R-CNN", 2015 IEEE International Conference on Computer Vision, (2015), 1440-1448.

Girshick, Ross, et al., "Rich Feature Hierarchies for Accurate Object Detection and Semantic Segmentation", Proceedings of the 2014 IEEE Conference on Computer Vision and Pattern Recognition, CVPR '14, (2014), 8 pgs.

He, Kaiming, et al., "Deep Residual Learning for Image Recognition", 2016 IEEE Conference on Computer Vision and Pattern Recognition, (2016), 770-778.

He, Kaiming, et al., "Spatial Pyramid Pooling in Deep Convolutional Networks for Visual Recognition", IEEE Transactions on Pattern Analysis and Machine Intelligence, 37(9), (Sep. 2015), 1904-1916.

Jaderberg, Max, et al., "Spatial Transformer Networks", NIPS, arXiv:1506.02025v3, (2016), 15 pgs.

Jiang, Wei, et al., "Personalized and Fine-Grained Object Detection for Home Service Robots", 6 pgs.

Krause, Jonathan, et al., "3D Object Representations for Fine-Grained Categorization", 2013 IEEE International Conference on Computer Vision Workshops, (2013), 555-561.

Krause, Jonathan, et al., "Fine-Grained Recognition without Part Annotations", 2015 IEEE Conference on Computer Vision and Pattern Recognition (CVPR), (2015), 5546-5555.

Lee, Seokju, et al., "Rich Feature Hierarchies from Omni-directional RGB-DI Information for Pedestrian Detection", The 12th International Conference on Ubiquitous Robots and Ambient Intelligence (URAI 2015), Oct. 28-30, 2015 / KINTEX, Goyang City, Korea, (2015), 362-367.

Lin, Di, et al., "Deep LAC: Deep Localization, Alignment and Classification for Fine-grained Recognition", (2015), 1666-1674.

Lin, Tsung-Yi, et al., "Microsoft COCO: Common Objects in Context", ECCV, arXiv:1405.0312, (2014), 1-15.

Lin, Tsung-Yu, et al., "Bilinear CNN Models for Fine-grained Visual Recognition", 2015 IEEE International Conference on Computer Vision, (2015), 1449-1457.

Liu, Wei, et al., "SSD: Single Shot MultiBox Detector", CVPR, arXiv:1512.02325, (2016), 17 pgs.

Northrup, M. Allen, et al., "A Miniature Analytical Instrument for Nucleic Acids Based on Micromachined Silicon Reaction Chambers", Analytical Chemistry, 70(5), (1998), 918-922.

Pan, Junting, et al., "Shallow and Deep Convolutional Networks for Saliency Prediction", 2016 IEEE Conference on Computer Vision and Pattern Recognition, (2016), 598-606.

Ren, Shaoqing, et al., "Faster R-CNN: Towards Real-Time Object Detection with Region Proposal Networks", IEEE Transactions on Pattern Analysis and Machine Intelligence, (2016), 14 pgs.

Schroff, Florian, et al., "FaceNet: A Unified Embedding for Face Recognition and Clustering", IEEE, (2015), 815-823.

Simonyan, Karen, et al., "Very Deep Convolutional Networks for Large-Scale Image Recognition.", ICLR 2015, arXiv:1409.1556, (Apr. 10, 2015), 14 pgs.

Wilber, Michael J, et al., "Learning Concept Embeddings with Combined Human-Machine Expertise", 2015 IEEE International Conference on Computer Vision, (2015), 981-989.

Xiao, Tianjun, et al., "The Application of Two-level Attention Models in Deep Convolutional Neural Network for Fine-grained Image Classification", IEEE, 842-850.

Zhang, Ning, et al., "Part-based R-CNNs for Fine-grained Category Detection", arXiv:1407.3867v1, European Computer Vision and Pattern Recognition (ECCV), (2014), 1-16.

Zhao, Bo, et al., "Diversified Visual Attention Networks for Fine-Grained Object Classification", arXiv:1606.08572, (2016), 1-10.

\* cited by examiner

FINE-GRAINED OBJECT RECOGNITION IN ROBOTIC SYSTEMS

FIELD OF THE INVENTION

The present disclosure is related to robotic systems and, in particular, to fine-grained object recognition in deep detection embedding networks for home service robots.

BACKGROUND

One important function of a home service robot is to be able to recognize small indoor objects such as cups, plates, controllers, cell-phones, keys, and bottles. However, it is difficult to perform recognition of small object due to the personalization of certain objects and a resulting fine-grained recognition issue.

Objects in a specific home for a home service robot may be personalized by a user making the object unique. Unique objects are harder to detect and recognize. For example, a home service robot not only needs to recognize a television controller category, a cup category, or a shoe category, but it also needs to discriminate between different instances within these categories. That is, the robot needs to be able to tell the difference between different controllers, one model of cell phone versus another, different shapes, sized, and colors of cups, or different sizes, styles, textures, and colors of shoes.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

Example 1 is a method for instance-level object recognition in a robotic system, the method comprising: obtaining an image of an object from an imaging device; determining, through a category-level deep detection neural network, a pre-defined category of the object, of a plurality of pre-defined categories of objects, based on the image of the object and pre-defined category-level object images stored in the robotic system; generating a feature map for the pre-defined category of the object determined by the category-level deep detection neural network; generating embedded features, based on the feature map, using an instance-level deep detection neural network corresponding to the pre-defined category of the object, wherein each pre-defined category of the plurality of predefined categories of objects comprises a corresponding different instance-level deep detection neural network; recognizing an instance-level of the object based on classification of the embedded features; and performing a robotic operation by the robotic system based on the instance-level recognition of the object.

In Example 2, the subject matter of Example 1 optionally includes wherein obtaining the image of the object comprises obtaining a plurality of images of the object, each image obtained from a different perspective and/or lighting condition.

In Example 3, the subject matter of Example 2 optionally includes using a deep detection neural network to generate a heat map for each of the plurality of images that emphasizes the category-level objects in the one or more images.

In Example 4, the subject matter of Example 3 optionally includes wherein generating the heat map comprises generating an attention value for each pixel of the one or more images wherein a higher attention value corresponds to a higher possibility of the pixel being the foreground object of interest.

In Example 5, the subject matter of Example 4 optionally includes generating a binary object mask image based on the heat map wherein pixels with attention values higher than a threshold are labeled as a first logical state and all other pixels are labeled with a second logical state that is opposite to the first logical state.

In Example 6, the subject matter of Example 5 optionally includes extracting the pre-defined category of object from the mask image based on the pixels labeled as the first logical state.

In Example 7, the subject matter of Example 6 optionally includes training the deep detection neural network to recognize the instance-level objects of the category-level objects comprises recognizing the instance-level of the object based on the extracted category-level object and augmented training data generated from a smallest rectangular box that contains the extracted category-level object.

In Example 8, the subject matter of Example 7 optionally includes wherein generating the augmented training data comprises: removing image pixels corresponding to the extracted category-level object from the mask image;

and embedding the removed image pixels into a set of background scene images to generate a set background scene images without the object to be used as augmented training images.

In Example 9, the subject matter of Example 8 optionally includes training the deep detection neural network on the pre-defined categories of objects by pre-defining object categories that are common to the environment in which the robotic system is deployed.

In Example 10, the subject matter of Example 9 optionally includes wherein training the deep detection neural network further comprises generating a forward-computed feature map for each category-level object.

In Example 11, the subject matter of Example 10 optionally includes wherein training the deep detection neural network to recognize instance-level objects comprises: generating the embedded features based on the forward-computed feature map; and adjusting the category-level object detection to determine a recognition of the instance-level objects based on the embedded features.

Example 12 is a robotic system, comprising: an imaging device coupled to the robot and positioned to capture images of objects within a field of view of the imaging device; a memory comprising instructions and pre-defined categories of object images; and one or more processors coupled to and in communication with the imaging device and the memory, wherein the one or more processors execute the instructions to: obtaining an image of an object from the imaging device; determining, through a category-level deep detection neural network, a pre-defined category of the object, of the plurality of predefined categories of objects, based on the image of the object and the pre-defined category-level object images stored in memory; generating a feature map for the pre-defined category of the object determined by the category-level deep detection neural network; generating embedded features, based on the feature map, using an instance-level deep detection neural network corresponding to the pre-defined category of the object, wherein each pre-defined category of the plurality of predefined categories of objects comprises a corresponding different instance-level deep detection neural network; and recognizing an instance-level of the object based on classification of the embedded features.

In Example 13, the subject matter of Example 12 optionally includes wherein the one or more processors further execute the instructions to pre-train the deep detection neural network with publicly available images or pre-defined objects prior to deployment to the environment.

In Example 14, the subject matter of Example 13 optionally includes wherein the one or more processors further execute the instructions to detect the pre-defined objects in the particular environment based on automatically obtained new training data obtained at the environment.

In Example 15, the subject matter of Example 14 optionally includes wherein the one or more processors further execute the instructions to: obtain images of the instance-level objects in the environment in which the robotic system is deployed; and transfer the images to a server remote from the environment in which the robotic system is deployed to fine tune the deep detection neural network to recognize instance-level objects of the category-level objects.

In Example 16, the subject matter of Example 15 optionally includes wherein the one or more processors further execute the instructions to: generate a set of background scene images that do not include the category-level object; and embed segmented foreground images into the set of background scene images.

In Example 17, the subject matter of Example 16 optionally includes wherein the one or more processor further execute the instructions to randomly sample the background scene images at different times and locations in the environment in which the robotic system is deployed.

Example 18 is a non-transitory computer-readable media storing computer instructions for fine grained object recognition in a robotic system, that when executed by one or more processors, cause the one or more processors to perform the steps of: obtain an image of an object from an imaging device; determine, through a category-level deep detection neural network, a pre-defined category of the object, of a plurality of predefined categories of objects, based on the image of the object and pre-defined category-level object images stored in the robotic system; generate a feature map for the pre-defined category of the object determined by the category-level deep detection neural network; generate embedded features, based on the feature map, using an instance-level deep detection neural network corresponding to the pre-defined category of the object, wherein each pre-defined category of the plurality of pre-defined categories of objects comprises a corresponding different instance-level deep detection neural network; and recognize an instance-level of the object based on classification of the embedded features.

In Example 19, the subject matter of Example 18 optionally includes wherein the executed instructions cause the one or more processors to perform bounding box annotation by determining a smallest box that bounds the category-level objects in an associated image.

In Example 20, the subject matter of Example 19 optionally includes wherein the executed instructions further cause the one or more processors to treat pixels in the image that are outside of the smallest box as hard background pixels.

DETAILED DESCRIPTION

Subsequent descriptions of the method and robotic system hardware modules refer to the implementation in a home service robot. This is for purposes of illustration only as the fine-grained object recognition may be implemented in other machines (e.g., robotic systems).

Subsequent discussion refers to objects as object categories (i.e., category-level objects) and object instances (instance-level objects). An object category or category-level object may be defined as a type of object. For example, cups, phones, shoes, and bottles are considered categories of objects. An instance of an object or an instance-level object refers to brands, types, or even models of that particular object category. In the example of a phone object, an instance of that phone would be a cell phone versus a home phone, a particular brand of phone, or even a particular model of a brand of phone (i.e. iPhone 4 versus iPhone 6).

The disclosed embodiments provide fine-grained object recognition by combining deep neural networks, a deep attention neural network for automatic training data acquisition, a deep detection neural network for category-level object detection, and a deep embedding neural network for fine-grained instance-level object recognition. The object recognition method employs a training stage and a testing stage to accomplish the recognition.

As is known in the art, a neural network comprises a large number of highly interconnected processing elements (neurons) working in unison to solve a specific problem (e.g., instance-level object classification). The neural network is not programmed but instead uses an arbitrary function approximation mechanism that "learns" from observed data after a certain amount of pre-training. The goal of the neural network is to solve problems in the same way that the human brain would. Using the ability to derive meaning from complicated or imprecise data, the neural network extracts patterns that are too complex to be noticed by either humans or other computer techniques. Deep attention, deep embedding, and instance-level detection neural networks each have specific tasks as defined by their label but operate in a substantially similar fashion.

The deep attention network is pre-trained over a large amount of training data that is agnostic to specific homes. In an embodiment, the deep attention network is pre-trained prior to use by a user in a home environment (e.g., during manufacture). The pre-training generates a heat map that emphasizes objects of interest. An object of interest may be defined as relatively small objects usable by a user such as telephones, keys, cups, articles of clothing, remote controls, bottles, etc. Such objects of interest, also referred to as category-level objects, are automatically segmented out to generate annotated training data (e.g., segmented foreground images) for the later detection and recognition steps. In an embodiment, the deep attention network may not be changed after pre-training and the network is deployed on the robotic system.

The deep detection neural network is trained to detect the category-level objects based upon the pre-training data using the deep attention network. The network may be pre-trained to detect a set of pre-defined popular object categories that are common for most household use (e.g., environment to which the robotic system is deployed) and, when the robotic system is deployed in a specific home, the parameters of the pre-trained network can be further fine-tuned to better accommodate specific object category detections in the specific home environment. For example, when new, uncommon object categories are introduced to the robotic system for detection, the network parameters may be either fine-tuned or re-trained if necessary to detect the new object categories.

The deep embedding network may be trained to recognize instance-level objects. For each category-level object, the deep embedding network may be trained to embed the detected category-level objects in that category into a multi-dimensional feature space based on which object classification category can be further applied to distinguish different instance-level objects. The deep embedding network shares part of its structure and parameters with the deep detection neural network. This reduces computation complexity in both the training stage and the test stage and alleviates overfitting when the training set is small.

The system may automatically obtain object-level training data with only a minimum amount of manual annotation from human supervision. For example, human supervision may be used when an unknown object is introduced to the robot and the format of the supervision may be limited to providing associated object categories. The proposed system may avoid use of complicated region-level annotation, which is very expensive for humans to label.

The robotic system may also provide a scalable effective solution for personalized and fine-grained object detection and recognition in home service robots. Compared with the conventional solution of training category-level detectors, the disclosed robotic system is able to distinguish instance-level objects. The disclosed robotic system provides: better scalability where a relatively smaller-capacity network can be used to detect category-level objects and instance-level objects in a hierarchical way, while the end-to-end solution requires much higher-capacity networks to distinguish the many object instances; reduced computations such that when a new object instance is added, the network only needs to fine-tune or re-train the corresponding embedding network of the associated object category, while the conventional solution requires fine-tuning or re-training of the entire end-to-end network; and reduced overfitting where the smaller-capacity network can be well trained using a relatively small amount of training data.

Figure 1:
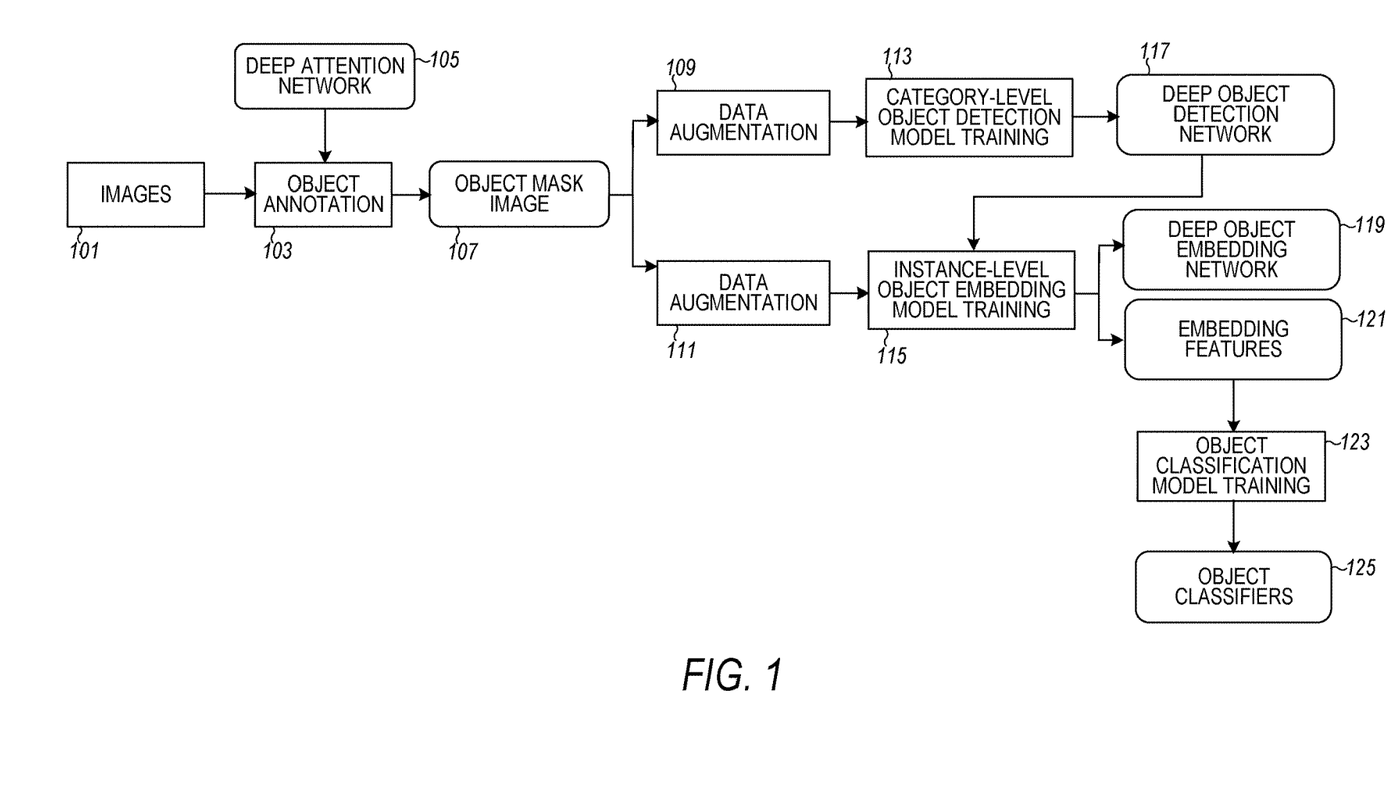
FIG. 1 is a flow diagram showing a training stage of a method for fine-grained object recognition in a robotic system, according to various embodiments.

FIG. 1 is a flow diagram showing a training stage of a method for fine-grained object recognition in a robotic system, according to various embodiments. At 101, images are obtained by the robotic system using an imaging device (e.g., camera). The images may include one or more video sequences of an object showing multiple different viewpoints of the object or one or more still images of the object showing the multiple different viewpoints.

In an embodiment for obtaining the object images by the robotic system, the user may place the object by a relatively simple and clean background when the object is introduced to the robotic system. For example, the object may be placed on a featureless table or a carpet with a simple texture. This reduces the noise (e.g., images unrelated to the object) in the images of the object. The robotic system may automatically move around the object to capture image frames of the object from a variety of views and angles.

In an embodiment, the user may introduce only one object at a time to the robotic system in order to avoid confusion. In another embodiment, the user may be requested to point out the object of interest and perform continuous tracking later on during data acquisition. To further improve the detection and recognition performance, the user may leave the object in the location over a period of time (e.g., one day) so that the robotic system can capture image frames of the object under different lighting conditions and from different perspectives.

In blocks 103 and 105, a pre-trained deep attention network is used for automatic object annotation. The object annotation block 103 provides generic attended foreground detection by indicating where the most attended foreground region is in the image, based on the pre-trained deep attention network 105. Different types of annotation may be used. For example, an object bounding box and an exact object mask are two such types of annotation. These types of annotation are for purposes of illustration only as other types may be used.

The deep attention network 105 is pre-trained using a relatively large amount of training data targeted at generating a heat map of an input image frame to emphasize training on a foreground of the objects of interest and filter out other portions of the image such as background objects, table features, or table texture. A heat map may be generated as a graphical representation of data where the individual values contained in a matrix that represents colors in the image. The pre-trained heat map data is stored in the deep attention network 105. The deep attention network 105 may be fixed once the robotic system is deployed to a particular home.

The heat map of the input image includes an attention value over each pixel, where each attention value is a number (can be floating number or integer) and higher attention values mean a higher possibility of the pixel being the foreground object of interest. Based on the heat map, foreground objects of interest can be extracted as the foreground connected regions. An automatic image segmentation method can be used to extract the foreground objects of interest based on the heat map. The binary object mask image 107 is input to data augmentation blocks 109, 111 along two separate paths.

The data augmentation blocks 109, 111 provide improvement of the pre-training data from the deep attention network 105. The data augmentation blocks 109, 111 provide substantially identical functions to generate substantially identical augmented data, as described subsequently. The generated augmented data is used differently in the category-level object detection model training block 113 and the instance-level object embedding model training block 115.

If bounding box annotation is used, the object bounding box is the smallest rectangular box that contains (i.e., bounds) the foreground object mask. The original image frame as well as the bounding boxes are used as training data in the data augmentation blocks 109, 111. At the same time, the image pixels corresponding to the foreground object mask are removed and embedded into a set of background scene images to generate a set background scene images without the object to be used as augmented training images. The set of background scene images without the object are randomly sampled from different times and locations at the particular home where the robotic system operates. Some randomness may be added with respect to the location and angle of foreground object embedding. The background images as well as the bounding boxes of the foreground objects in the generated images are used as the augmented training data.

In addition, based on the original bounding box, an automatic binary image segmentation process may be performed during the data augmentation 109, 111. For example, by treating pixels outside the bounding box as hard background pixels, and by treating pixels in the center of the bounding box as hard foreground pixels, the method described in V. Lempitsky et al., *Image segmentation with a bounding box prior*, ICCV 2009 can be used to segment the foreground object from the background. Since the background of the image frames for automatic object annotation is relatively simple, such a process may be able to generate a better foreground object mask than without. The segmented foreground is also embedded into the set of scene background images without the object, in the same way as the original object masks, to generate additional augmented training data. Based on the data from both the original object mask block 107 and the augmented training data block 109, the category-level object detection model training block 113 trains a category-level object deep detection network 117.

The deep detection neural network 117 can be pre-trained to detect a set of pre-defined object categories that are common for most homes (e.g., cups, bottles, shoes, etc.). Such pre-training can store publically available annotated training images or images that were pre-trained by the user in memory of the robotic system. When the robotic system is deployed to the particular home, the pre-trained network can be fine-tuned to detect these pre-defined categories of objects in the particular home based on the automatically obtained new training data obtained at the particular home. For newly added object categories that are personalized for the specific home, the deep object detection network 117 may be further fine-tuned to accommodate the detection of these new categories.

Thus, the instance-level object embedding model training block 115 provides the ability to distinguish personalized and fine-grain object instances in a particular home or other deployed environment based on data from the original object mask block 107, the augmented training data block 109, and the deep object detection network 117. The training data from the deep object detection network 117 is also used in the instance-level object embedding model training block 115 by the sharing of network structures and parameters. In an embodiment, a number of layers of the pre-trained detection network can be either fixed or tuned with very small learning rates. The structure of the last classification layer may be changed to add in the new category and the last few layers of the network may be fine-tuned with a large learning rate or re-trained.

A deep object embedding network 119 is trained for each object category. This may be accomplished by embedding the image pixels within the foreground object bounding box into a multi-dimensional feature space. In an embodiment, the deep object embedding network 119 with a triplet-loss layer shares part of its structures and parameters with the deep object detection network 117. A triplet-loss layer computes an output embedded feature so that the squared distance between all training samples of the same object instance is small, while the squared distance between a pair of training samples from different object instances is large. That is, the embedded feature space is discriminative to distinguish different object instances in the object category. This reduces computation complexity in both the training and test stages and alleviates overfitting when the training set is small. For example, the first set of layers in the deep detection neural network is directly used as the first set of layers in the deep embedding network, and the parameters of these layers are fixed as the parameters from the deep detection neural network. Usually, such layers are the convolutional layers before the last few fully connected layers and classification layers. Then, a few fully-connected layers are attached to these fixed layers, and the triplet-loss layer is attached to the end of the deep embedding network. These newly attached layers are re-trained using the newly annotated training objects.

An embedding features block 121 generates embedded features for an object classification model training block 123 based on which object classifier is trained to recognize each object instance in a corresponding object category. The embedding features block 121 includes a different, corresponding deep instance-level detection neural network for each pre-defined category of an object. In an embodiment, a support vector machine classifier may be used as the classifier trained over the multi-dimensional feature space. The resulting object classifier block 125 is then used in the testing stage, as discussed subsequently with reference to FIG. 2.

Figure 2:
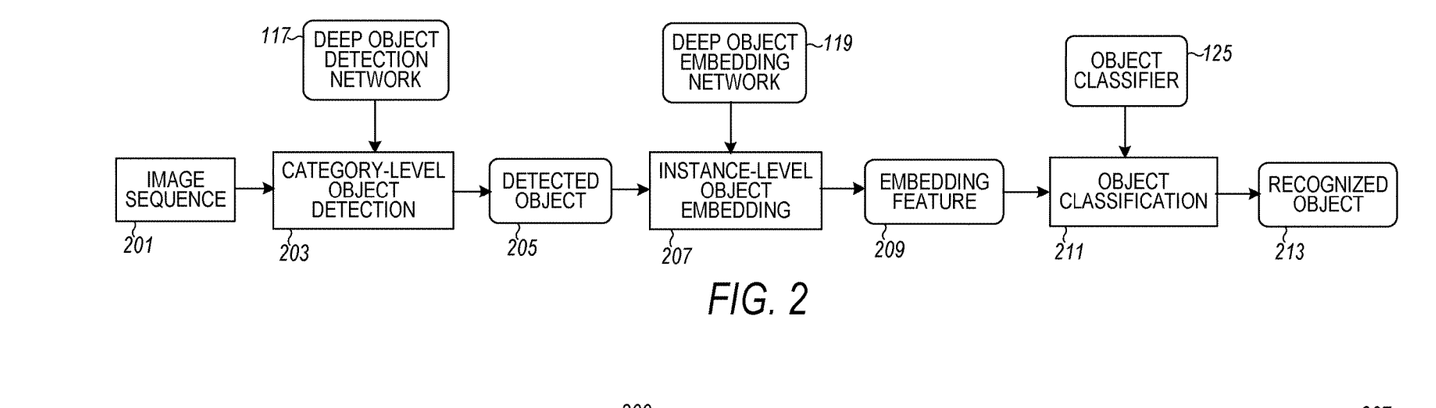
FIG. 2 is a flow diagram showing a testing stage of the method for fine-grained object recognition in a robotic system, according to various embodiments.

FIG. 2 is a flow diagram showing a testing stage of the method for fine-grained object recognition in a robotic system, according to various embodiments. Given an input image sequence (e.g., video, plurality of images) 201 to identify an object, the robotic system first detects category-level objects in block 203. This category-level object detection is accomplished from the image frames based on the deep object detection network 117 as accumulated during the training stage of FIG. 1. The result is the detected object in block 205.

In block 207, an instance-level object embedding block 207 takes the detected object 205 and the training data from the deep object embedding network 119 and generates a multi-dimensional embedding feature in block 209. The multi-dimensional embedding feature is generated for each detected object 205 based on the objects corresponding deep object embedding network 119 for the object category. In block 211, the object classifiers 125 from the training stage are used to perform object classification on the embedded features to generate different instance-level objects. The result, in block 213, is a recognized instance-level object. The robotic system may then perform a robotic operation using the resulting recognition of the instance-level object.

Figure 3:
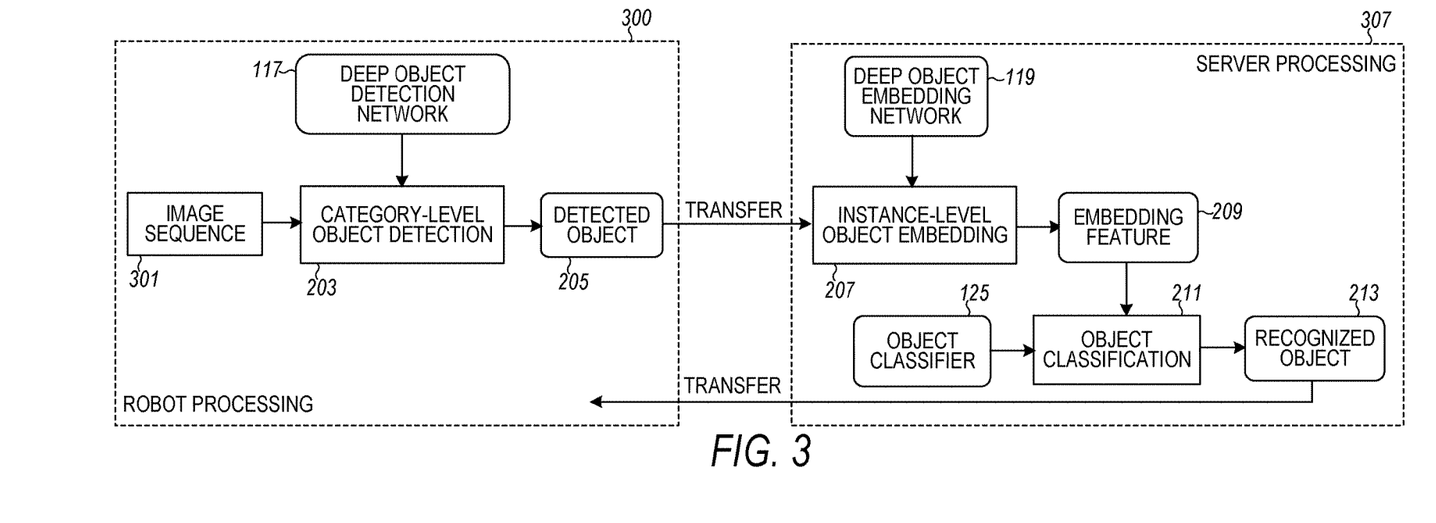
FIG. 3 is diagram of a robotic system, according to various embodiments.

In an embodiment, the blocks of FIGS. 1 and 2 are located in the local robotic system. However, due to computation concerns, especially when there are a large amount of instance-level objects within any of the object categories, it may be preferable to move the computationally heavy parts of the system to other computation platforms. For example, the more computationally heavy functions may be moved to a computer server that is communicated with over a wired or wireless channel from the robotic system. FIG. 3 illustrates one embodiment of a framework of such a system.

FIG. 3 is diagram of a robotic system having a robot portion 300 and a server portion 301, according to various embodiments. In this embodiment, the category-level object detection modules are hosted on the robot 300 and all other parts are moved to the server 301. The advantage of this design is both the reduced amount of data being transferred and the reduced computation. The transferred data are the forward-computed feature maps of the last shared layer of the deep detection neural network and the deep embedding network that correspond to the detected objects. The feature maps are typically much smaller than the original image frames to transfer. On the server, the embedding network can directly use the transferred feature map to continue with the embedding feature computation.

Operation of the robotic system of FIG. 3 is discussed previously with reference to FIGS. 1 and 2. FIG. 3 simply shows the offloading of the instance-level computations to the server 301 that is remote from the robotic system (e.g., not located at the deployed environment). Thus, reference may be made to the previous discussion for operation of this system.

The robot 300 comprises the imaging device that provides the image sequences 301. As described subsequently, the imaging device may be any image sensor for either still images or video sequences.

The robot 300 further includes the deep object detecting network 117 that is coupled to the category-level object block 203. The resulting category-level detected object block 205 is also part of the robot 300. The category-level detected object is transferred to the server 301 for further processing to determine the instance-level object.

The server 301 includes the instance-level object embedding block 207 that uses the category-level detected object from the robot and the training data from the deep object embedding network 119. The embedding feature block 209 is also part of the server 301 to take the object classifiers 125 from the training stage to perform object classification in the object classification block 211 of the server 300 on the embedded features to generate different instance-level objects. The result, in block 213, is the recognized instance-level object block 213 that is transferred back to the robot 300 for further use such as a robotic operation (e.g., pick up the object, move the object, operate the object).

The robot 300 may make use of the recognized object in many ways. For example, if the user instructs the robot to fill a particular cup, the robot can use the described embodiments to determine an instance of that particular cup, versus other cups, and fill that cup. The robot 300 may make other uses of the recognized objects depending on the user's desire and/or the robot's capabilities.

Figure 4:
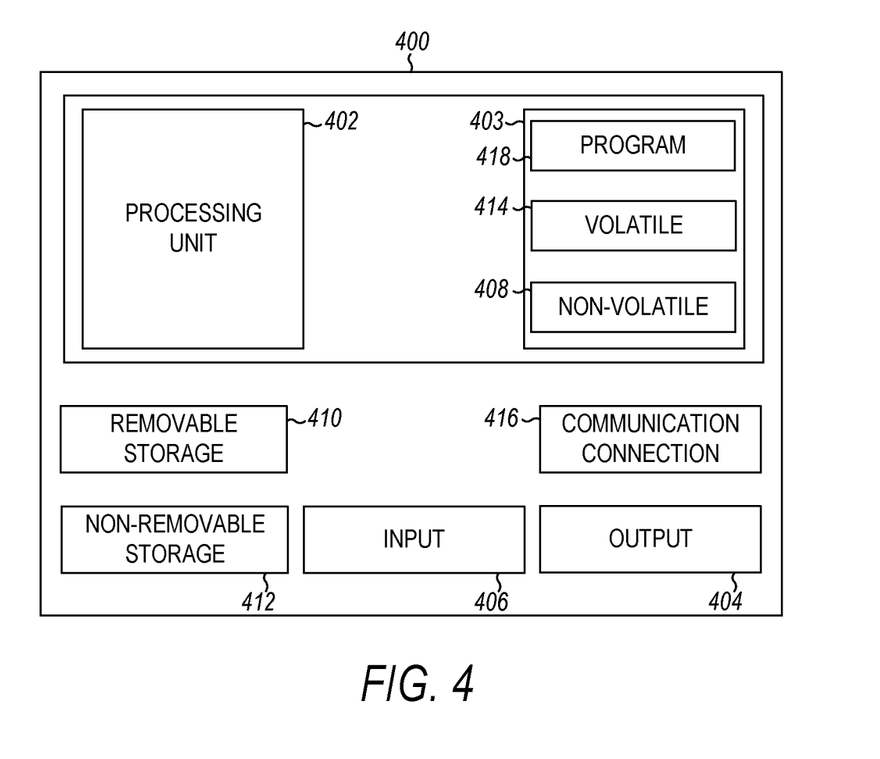
FIG. 4 is a block diagram illustrating circuitry for a robotic system for performing methods, according to example embodiments.

FIG. 4 is a block diagram illustrating circuitry for a robotic system 400 for performing methods, according to example embodiments. All components need not be used in various embodiments. The robotic system may also be referred to as a computing device or a computer 400.

One example robotic system 400 may include a processing unit 402, memory 403, removable storage 410, and non-removable storage 412. The processing unit 402 may comprise one or more processors (e.g., control circuitry) that execute instructions stored in memory 403 to realize the embodiments of FIGS. 1-3. Although the various data storage elements are illustrated as part of the robotic system 400, the storage may also or alternatively include cloud-based storage accessible via a network, such as the Internet or server based storage that is accessible over a wired or wireless channel.

The memory 403 may include volatile memory 414 and non-volatile memory 408. The robotic system 400 may include, or have access to, a computing environment that includes a variety of computer-readable media, such as volatile memory 414 and non-volatile memory 408, removable storage 410 and non-removable storage 412. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

The robotic device 400 may include or have access to a computing environment that includes input 406, output 404, and a communication connection 416. The output 404 may include a display device, such as a touchscreen, that also may serve as an input device. The input 406 may include one or more of a touchscreen, touchpad, mouse, keyboard, camera, one or more device-specific buttons, one or more sensors integrated within or coupled via wired or wireless data connections to the robotic system 400, and other input devices.

The computer may operate in a networked environment using the communication connection 416 to connect to one or more remote computers, such as database servers. The communication connection 416 may include any radios necessary to implement one or more radio access technologies. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable medium are executable by the processing unit 402 of the computer 400. A hard drive, CD-ROM, and RAM are some examples of articles including a non-transitory computer-readable medium such as a storage device. The terms computer-readable medium and storage device do not include carrier waves to the extent carrier waves are deemed too transitory.

The embodiments discloses herein provide multiple benefits over conventional object classification. For example, the embodiments provide an automatic system that obtains object-level training data with only a minimum amount of manual annotation. Human supervision may only be used when an unknown object is introduced to the robot. The format of supervision is limited to providing associated object categories. The robotic system does not need complicated region-level annotation that may be very expensive for human to label.

The robotic system also provides a scalable and effective solution for personalized and fine-grained object detection and recognition in home service robots. Compared with the conventional prior art solution of training category-level detectors, the robotic system is able to distinguish instance-level objects. Additionally, the conventional solution of training end-to-end deep object detection networks that treat each object instance as a single class, the proposed system has three major benefits: better scalability where a relatively smaller-capacity network can be used to detect category-level objects, while the end-to-end solution requires much higher-capacity networks to distinguish the many object instances; reduced computation such that when a new object instance is added, the network only needs to fine-tune or re-train the corresponding embedding network of the associated object category, while the end-to-end solution requires to fine-tune or re-train the entire end-to-end network; and reduced overfitting where the smaller-capacity network can be well trained using the small amount of noisy training data.

The present embodiments combine three deep neural networks for object detection and recognition in home service robots. The deep neural networks include a deep attention network for automatic training data acquisition, a deep detection neural network for category-level object detection, and a deep embedding network for fine-grained instance-level object recognition.

In the previous description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method for instance-level object recognition in a robotic system, the method comprising:
    obtaining an image of an object from an imaging device;
    determining, through a category-level deep detection neural network, a pre-defined category of the object, of a plurality of predefined categories of objects, based on the image of the object and pre-defined category-level object images stored in the robotic system;
    generating a feature map for the pre-defined category of the object determined by the category-level deep detection neural network;
    generating embedded features, based on the feature map, using an instance-level deep detection neural network corresponding to the pre-defined category of the object, wherein each pre-defined category of the plurality of predefined categories of objects comprises a corresponding different instance-level deep detection neural network;
    recognizing an instance-level of the object based on classification of the embedded features; and
    performing a robotic operation by the robotic system based on the instance-level recognition of the object.

2. The method of claim 1, wherein obtaining the image of the object comprises obtaining a plurality of images of the object, each image obtained from a different perspective and/or lighting condition.

3. The method of claim 2, further comprising using a deep detection neural network to generate a heat map for each of the plurality of images that emphasizes the pre-defined category-level object images in the one or more images.

4. The method of claim 3, wherein generating the heat map comprises generating an attention value for each pixel of the one or more images wherein a higher attention value corresponds to a higher possibility of the pixel being a foreground object of interest.

5. The method of claim 4, further comprising generating a binary object mask image based on the heat map wherein pixels with attention values higher than a threshold are labeled as a first logical state and all other pixels are labeled with a second logical state that is opposite to the first logical state.

6. The method of claim 5, further comprising extracting the pre-defined category of the object from the mask image based on the pixels labeled as the first logical state.

7. The method of claim 6, further comprising training the deep detection neural network to recognize the instance-level of the objects of the category-level objects, wherein recognizing the instance-level of the category-level objects is based on the extracted pre-defined category of the object and augmented training data generated from a smallest rectangular box that contains the extracted pre-defined category.

8. The method of claim 7, wherein generating the augmented training data comprises:
    removing image pixels corresponding to the extracted pre-defined category of the object from the mask image; and
    embedding the removed image pixels into a set of background scene images to generate a set background scene images without the object to be used as augmented training images.

9. The method of claim 8, further comprising training the deep detection neural network on pre-defined categories of objects by pre-defining object categories that are common to an environment in which the robotic system is deployed.

10. The method of claim 9, wherein training the deep detection neural network further comprises generating a forward-computed feature map for each category-level object.

11. The method of claim 10, wherein training the deep detection neural network to recognize the instance-level objects comprises:
    generating the embedded features based on the forward-computed feature map; and
    adjusting category-level object detection to determine a recognition of the instance-level objects based on the embedded features.

12. A robotic system, comprising:
    an imaging device coupled to the robot and positioned to capture images of objects within a field of view of the imaging device;
    a memory comprising instructions and pre-defined categories of object images; and
    one or more processors coupled to, and in communication with, the imaging device and the memory, wherein the one or more processors execute the instructions to:
        obtain an image of an object from the imaging device;
        determine, through a category-level deep detection neural network, a pre-defined category of the object, of a plurality of predefined categories of objects, based on the image of the object and the pre-defined category-level object images stored in memory;

generate a feature map for the pre-defined category of the object determined by the category-level deep detection neural network;

generate embedded features, based on the feature map, using an instance-level deep detection neural network corresponding to the pre-defined category of the object, wherein each pre-defined category of the plurality of predefined categories of objects comprises a corresponding different instance-level deep detection neural network;

recognize an instance-level of the object based on classification of the embedded features; and perform a robotic operation based on the instance-level recognition of the object.

13. The system of claim 12, wherein the one or more processors further execute the instructions to pre-train the deep detection neural network with publicly available images or pre-defined objects prior to deployment to an environment.

14. The system of claim 13, wherein the one or more processors further execute the instructions to detect the pre-defined objects in the environment based on automatically obtained new training data obtained at the environment.

15. The system of claim 14, wherein the one or more processors further execute the instructions to:

obtain images of the instance-level objects in the environment in which the robotic system is deployed; and transfer the images to a server remote from the environment in which the robotic system is deployed to fine tune the deep detection neural network to recognize instance-level objects of the category-level object images.

16. The system of claim 15, wherein the one or more processors further execute the instructions to:

generate a set of background scene images that do not include the category-level object; and embed segmented foreground images into the set of background scene images.

17. The system of claim 16, wherein the one or more processor further execute the instructions to randomly sample the background scene images at different times and locations in the environment in which the robotic system is deployed.

18. A non-transitory computer-readable media storing computer instructions for fine grained object recognition in a robotic system, that when executed by one or more processors, cause the one or more processors to perform the steps of:

obtain an image of an object from an imaging device;

determine, through a category-level deep detection neural network, a pre-defined category of the object, of a plurality of predefined categories of objects, based on the image of the object and pre-defined category-level object images stored in the robotic system;

generate a feature map for the pre-defined category of the object determined by the category-level deep detection neural network;

generate embedded features, based on the feature map, using an instance-level deep detection neural network corresponding to the pre-defined category of the object, wherein each pre-defined category of the plurality of predefined categories of objects comprises a corresponding different instance-level deep detection neural network;

recognize an instance-level of the object based on classification of the embedded features; and perform a robotic operation based on the instance-level recognition of the object.

19. The non-transitory computer-readable media of claim 18, wherein the executed instructions cause the one or more processors to perform bounding box annotation by determining a smallest box that bounds the category-level objects in an associated image.

20. The non-transitory computer-readable media of claim 19, wherein the executed instructions further cause the one or more processors to treat pixels in the image that are outside of the smallest box as hard background pixels.

* * * * *